(12) United States Patent
Utsumi (10) Patent No.: US 11,214,505 B2
(45) Date of Patent: Jan. 4, 2022

(54) METHOD FOR PRODUCING SYNTHETIC QUARTZ GLASS

(71) Applicants: Shin-Etsu Quartz Products Co., Ltd., Tokyo (JP); Heraeus Quarzglas GmbH & Co. KG, Hanau (DE)

(72) Inventor: Manabu Utsumi, Nagasaki (JP)

(73) Assignees: Shin-Etsu Quartz Products Co., Ltd., Tokyo (JP); Heraeus Quarzglas GmbH & Co. KG, Hanau (DE)

( * ) Notice: Subject to any disclaimer, the term of this patent is extended or adjusted under 35 U.S.C. 154(b) by 346 days.

(21) Appl. No.: 15/959,796

(22) Filed: Apr. 23, 2018

(65) Prior Publication Data

US 2018/0305236 A1 Oct. 25, 2018

(30) Foreign Application Priority Data

Apr. 24, 2017 (JP) .............................. JP2017-085708

(51) Int. Cl.
*C03B 25/02* (2006.01)
*C03C 3/06* (2006.01)
(Continued)

(52) U.S. Cl.
CPC ............... *C03B 25/02* (2013.01); *C03C 3/06* (2013.01); *C03C 23/007* (2013.01); *C03C 2201/02* (2013.01); *C03C 2203/52* (2013.01)

(58) Field of Classification Search
None
See application file for complete search history.

(56) References Cited

U.S. PATENT DOCUMENTS

2005/0183461 A1\* 8/2005 Kuhn ....................... C21D 1/30
65/422
2005/0217318 A1\* 10/2005 Kuhn ................... C03B 19/1453
65/32.3

(Continued)

FOREIGN PATENT DOCUMENTS

EP   1 138 640      10/2001
EP   2 910 531       8/2015
(Continued)

OTHER PUBLICATIONS

"Surface Area-to-Volume Ratio." Wikipedia, Dec. 31, 2016, web.archive.org/web/20161231043845/en.wikipedia.org/wiki/Surface-area-to-volume_ratio. (Year: 2016).\*
(Continued)

*Primary Examiner* — Alison L Hindenlang
*Assistant Examiner* — Andrés E. Behrens, Jr.
(74) *Attorney, Agent, or Firm* — Dicke, Billig & Czaja, PLLC (57) ABSTRACT

One aspect is a process to producing a synthetic quartz glass, including an annealing treatment that includes: putting a synthetic quartz glass as a parent material into a heat treatment furnace; elevating a temperature in the heat treatment furnace to a prescribed keeping temperature that is equal to or higher than the annealing point; keeping the keeping temperature; annealing the synthetic quartz glass; and taking the synthetic quartz glass out of the heat treatment furnace. The process includes determining an annealing rate v [° C./h] of the annealing step based on a value of S/V [$mm^2/mm^3$], wherein S [$mm^2$] is the surface area of the synthetic quartz glass as a parent material and V [$mm^3$] is the volume thereof and a target birefringence Re [nm/cm] for the synthetic quartz glass after the annealing, and the annealing step is performed at the determined annealing rate v.

11 Claims, 2 Drawing Sheets

(51) Int. Cl.
*C03C 23/00* (2006.01)
*C03B 25/00* (2006.01)

(56) References Cited

U.S. PATENT DOCUMENTS

2010/0162759 A1 7/2010 Duran et al.
2015/0239766 A1 8/2015 Yagi et al.

FOREIGN PATENT DOCUMENTS

| JP | 2005-289801 | 10/2005 |
| JP | 2010-155778 | 7/2010 |
| JP | 2015-155362 | 8/2015 |
| JP | 2015178422 | 10/2015 |
| WO | 2006/104179 | 10/2006 |

OTHER PUBLICATIONS

"Annealing (Glass)." Wikipedia, Wikimedia Foundation, Mar. 10, 2017, en.wikipedia.org/wiki/Annealing_(glass)#:~:text=Annealing%20is%20a%20process%20of,internal%20stresses%20introduced%20during%20manufacture. (Year: 2017).*

Celikbilek Ersundu, Miray & Ersundu, Ali Erçin & Aydin, S . . . (2012). Crystallization Kinetics of Amorphous Materials. Chapter: 6, Publisher: InTech, pp. 127-162 (Year: 2012).*

Martin, S.W. "Relaxation in Glass: Review of Thermodynamics." Lehigh University, May 28, 2016, web.archive.org/web/20160528092613/www.lehigh.edu/imi/teched/Relax2010/Lecture11_martin.pdf. (Year: 2010).*

"Gibbs Free Energy." Wikipedia, Wikimedia Foundation, Jan. 17, 2017, https://web.archive.org/web/20170117030525/https://en.wikipedia.org/wiki/Gibbs_free_energy (Year: 2017).*

"Thermodynamic Free Energy."Wikipedia, Wikimedia Foundation, Nov. 12, 2016, https://web.archive.org/web/20161112203011/https://en.wikipedia.org/wiki/Thermodynamic_free_energy. (Year: 2016).*

"Gibbs Free Energy-Minimum or Zero?" Chemistry Stack Exchange, Apr. 25, 2012, chemistry.stackexchange.com/questions/4/gibbs-free-energy-minimum-or-zero#:~:text=Gibbs%20free%20energy%20is%20a,more%20work%20can%20be%20done. (Year: 2012).*

* cited by examiner

METHOD FOR PRODUCING SYNTHETIC QUARTZ GLASS

CROSS-REFERENCE TO RELATED APPLICATION

This Utility patent application claims priority to Japanese Patent Application No. JP 2017-085708, filed on Apr. 24, 2017, which is incorporated herein by reference.

BACKGROUND

The present embodiments relates to a method for producing synthetic quartz glass.

Recently there has been demand for control of the birefringence of synthetic quartz glass, and demand for synthetic quartz glass of various shapes and sizes, for use as lenses for exposure equipment and the like. Generally, in the temperature elevation step, the temperature is elevated until the temperature inside the glass is at or above the annealing point, and then the synthetic quartz glass is cooled slowly to decrease the temperature distribution inside the glass and thereby control the birefringence. Also, the periphery is covered by a material of higher specific heat than the synthetic quartz glass to be treated, in order to further decrease the heat distribution and thereby lower the birefringence.

For example, patent document 1 describes a method for obtaining glass of low birefringence by gradually slowing the annealing rate. But in patent document 1 there is no mention of the size of the glass to be treated.

Patent document 2 describes a method for keeping the fictive temperature inside the glass as constant as possible by controlling the temperature and time of the temperature elevation step and cooling step. But in patent document 2, as in patent document 1, there is no mention of the size of the glass to be treated.

Patent document 3 describes a method for obtaining glass having a birefringence of ≤2 nm/cm by specifying the temperature elevation step and annealing step. But in patent document 3, the target birefringence is limited to ≤2 nm/cm, and the examples only mention data for one size of glass block.

PATENT DOCUMENTS

[Patent document 1] Japanese unexamined patent application 2010-155778
[Patent document 2] Japanese unexamined patent application 2005-289801
[Patent document 3] Japanese unexamined patent application 2015-155362

For these and other reasons, a need exists for the present embodiments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

As described above, in conventional methods, synthetic quartz glass of comparatively low heat distribution is treated under the same conditions as synthetic quartz glass of high heat distribution. Consequently, excessive annealing treatment times are required and so costs increase.

Performing the annealing treatment having covered the periphery using material of high specific heat does allow the direction of heat radiation to be controlled and is therefore appropriate for controlling the birefringence fast axis orientation, but it tends to lengthen the treatment time in the temperature elevation step and in the annealing step and so costs increase.

The internal temperature distribution determines the birefringence after the annealing treatment, and although the internal temperature distribution varies depending on the size and shape of the synthetic quartz glass, there is no method wherein the heat treatment program is selected in accordance with the size of the synthetic glass to be treated; there is therefore need for a method that allows the treatment to be performed efficiently in accordance with a program that is appropriate for the size of the glass to be treated and the target birefringence.

The heat treatment methods described in patent documents 1-3 achieve low birefringence, or control the birefringence fast axis orientation, but cannot be described as methods wherein an appropriate program is selected in accordance with the size of the glass to be treated and the target birefringence.

The internal temperature distribution, which determines the birefringence after the annealing treatment, varies depending on the size and shape of the synthetic quartz glass. However, conventionally, the annealing treatment is performed under the same conditions regardless of the size of the synthetic quartz glass. Consequently, when synthetic quartz glass of relatively low heat distribution is treated under the conditions for treating synthetic quartz glass of high heat distribution, excessive annealing times are required and so costs increase.

In view of this problem, the aim of the present embodiments are to provide a method for producing synthetic quartz glass whereby it is possible to select an appropriate annealing rate in accordance with the size of the synthetic quartz glass to be annealed, and to perform the annealing at said appropriate annealing rate.

In order to overcome the abovementioned problem, one embodiment provides a method for producing synthetic quartz glass which includes a quartz glass annealing treatment, where the annealing treatment includes a step whereby the synthetic quartz glass, as parent material, is put into a heat treatment furnace; a temperature elevation step whereby the temperature inside the heat treatment furnace is elevated to a prescribed keeping temperature that is equal to or higher than the annealing point of the synthetic quartz glass; a first keeping step whereby the temperature inside the heat treatment furnace is kept at the abovementioned keeping temperature; an annealing step whereby, after the first keeping step, the synthetic quartz glass is annealed by gradually lowering the temperature inside the heat treatment furnace to a prescribed temperature, while heating the inside of the heat treatment furnace; and a step whereby the annealed synthetic quartz glass is taken out of the heat treatment furnace, wherein the process includes a step for determining an annealing rate v [° C./h], which is the rate at which the synthetic quartz glass will anneal in the annealing step, based on an S/V value [mm$^2$/mm$^3$] wherein S [mm$^2$] is the surface area and V [mm$^3$] is the volume of the synthetic quartz glass used as parent material, and on the target birefringence Re [nm/cm] of the synthetic quartz glass after the annealing, and the annealing step is performed at the determined annealing rate v.

With this process for producing synthetic quartz glass, an appropriate annealing rate can be selected in accordance with the size of the synthetic quartz glass to be annealed and the target birefringence, and synthetic quartz glass can be produced by annealing the synthetic quartz glass at the abovementioned appropriate annealing rate.

In the step for determining the abovementioned annealing rate v [° C./h] in the inventive process for producing synthetic quartz glass, the annealing rate v is in one embodiment determined from the abovementioned S/V value [mm$^2$/mm$^3$] and the abovementioned target birefringence Re [nm/cm] such that expression (1) below $$v \leq (Re + 390 \times S/V)/1.0 \quad (1)$$

is satisfied.

Determining the annealing rate v to satisfy expression (1) allows annealing to be performed having set a more appropriate annealing rate.

Also, in such cases it is preferable in one embodiment to determine the abovementioned annealing rate v in a range such that abovementioned expression (1) and expression (2) below $$v \geq 0.8 \times (Re + 390 \times S/V)/1.0 \quad (2)$$

are both satisfied.

Determining the annealing rate v in a range such that both expression (2) and abovementioned expression (1) are satisfied allows annealing to be performed having set an even more appropriate annealing rate.

Also, the inventive process for producing synthetic quartz glass can be performed without using heat-insulating material around the periphery of the abovementioned synthetic quartz glass in the abovementioned annealing treatment.

Thus heating times and annealing treatment times can be shortened because no heat-insulating material is used.

Also, the shape of the abovementioned synthetic quartz glass used as parent material can be cylindrical or disk-shaped.

It can be appropriate to employ one embodiment when the synthetic quartz glass used as the parent material is cylindrical or disk-shaped.

Also, the abovementioned synthetic quartz glass used as the parent material is in one embodiment preferably such that the abovementioned S/V value is $\geq 0.012$ mm$^2$/mm$^3$ but $\leq 0.4$ mm$^2$/mm$^3$.

It can be appropriate to employ one embodiment when synthetic quartz glass having such an S/V value is used as the parent material.

Also, the target birefringence Re [nm/cm] of the synthetic quartz glass after the abovementioned annealing is in one embodiment preferably $\geq 1.0$ nm/cm but $\leq 10.00$ nm/cm.

It can be appropriate to employ one embodiment when the target birefringence Re is within this range.

Also, the keeping temperature in the abovementioned first keeping step is in one embodiment preferably $\geq 1040°$ C. but $\leq 1300°$ C., and the annealing step in one embodiment preferably includes annealing from the keeping temperature in the abovementioned first keeping step to a temperature that is lower than the keeping temperature in the first keeping step and $\geq 950°$ C. but $\leq 1160°$ C.

By performing the first keeping step and the annealing step at these temperatures, the annealing can be performed under appropriate conditions.

The inventive process for producing synthetic quartz glass can also include a natural cooling step where, after completion of the annealing step, the abovementioned heating of the heat treatment furnace is stopped and the temperature inside the heat treatment furnace is allowed to drop; after the natural cooling step, the annealed synthetic quartz glass is taken out of the abovementioned heat treatment furnace.

The inventive process for producing synthetic quartz glass can also include a second keeping step where, after the abovementioned annealing step, the temperature is kept at the temperature on completion of the annealing step; and a natural cooling step where, after completion of the second keeping step, the abovementioned heating of the heat treatment furnace is stopped and the temperature inside the heat treatment furnace is allowed to drop; after the natural cooling step, the abovementioned annealed synthetic quartz glass is taken out of the abovementioned heat treatment furnace.

Thus the inventive process for producing synthetic quartz glass can allow natural cooling after annealing, after which the annealed synthetic quartz glass is taken out; and it can also include a keeping step whereby, after annealing, the temperature is kept at a specific temperature, and then the synthetic quartz glass that has cooled naturally is taken out.

The inventive process for producing synthetic quartz glass allows synthetic quartz glass of the desired birefringence to be produced by selecting an appropriate annealing rate in accordance with the size of the synthetic quartz glass to be annealed, and annealing the synthetic quartz glass at the appropriate annealing rate. It can therefore be expected to optimize annealing times; specifically, it can prevent insufficient annealing caused by the annealing time having been too short, and it can prevent increased costs caused by the annealing time having been too long.

The present inventors conducted experiments and investigations to solve the abovementioned problem. As a result, they discovered that there is a specific relationship between the S/V value, obtained by dividing surface area by volume, of the synthetic quartz glass parent material to be annealed, the birefringence of the synthetic quartz glass after annealing, and the annealing rate. They then perfected the embodiments upon discovering that by using this correlation, an appropriate annealing rate v based on the target birefringence and the S/V value of the parent material can be set prior to the annealing treatment.

The inventive process for heat-treating synthetic quartz glass is described specifically below.

One embodiment is a process for producing synthetic quartz glass which includes a synthetic quartz annealing treatment; the annealing treatment includes the following steps.

A step whereby the synthetic quartz glass, as parent material, is inserted into a heat treatment furnace A temperature elevation step whereby the temperature inside the heat treatment furnace is elevated to a prescribed keeping temperature that is equal to or higher than the annealing point of the synthetic quartz glass A first keeping step whereby the temperature inside the heat treatment furnace is kept at the abovementioned keeping temperature An annealing step whereby, after the first keeping step, the synthetic quartz glass is annealed by gradually lowering the temperature inside the heat treatment furnace to a prescribed temperature, while heating the inside of the heat treatment furnace A step whereby the annealed synthetic quartz glass is taken out of the heat treatment furnace.

The inventive process for producing synthetic quartz glass also includes a step for determining an annealing rate v [° C./h], which is the rate at which the synthetic quartz glass will anneal in the annealing step, based on an S/V value [mm$^2$/mm$^3$] wherein S [mm$^2$] is the surface area and V [mm$^3$] is the volume of the synthetic quartz glass used as parent material, and on the target birefringence Re [nm/cm] of the synthetic quartz glass after the annealing. Also, the abovementioned annealing step is performed at the annealing rate v that was determined in this step.

If the process for producing synthetic quartz glass includes such a step, an appropriate annealing rate can be selected in accordance with the size of the synthetic quartz glass to be annealed, and the synthetic quartz glass can be annealed at the appropriate annealing rate.

Figure 1:
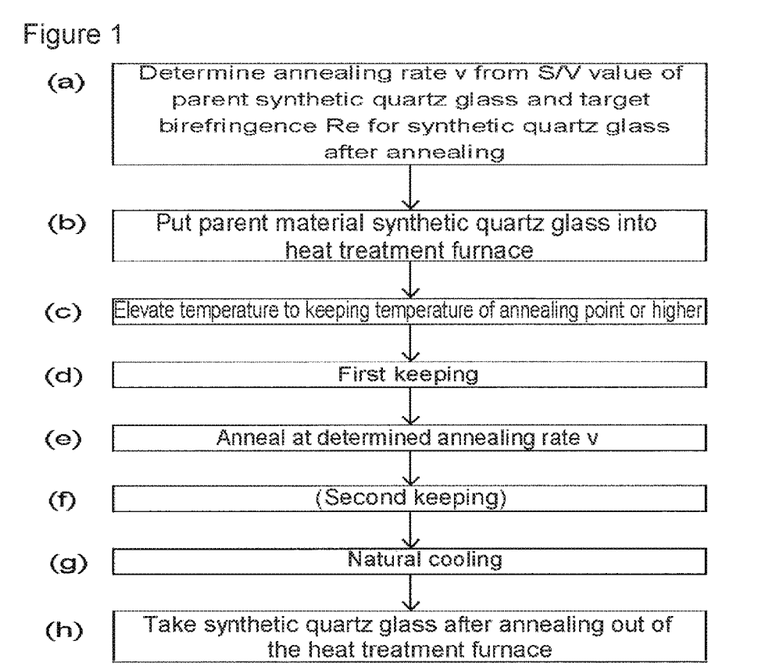
FIG. 1 is a flow diagram illustrating the sequence of steps in the method for producing synthetic quartz glass in accordance with one embodiment.

The inventive process for producing synthetic quartz glass is described in more detail below, with reference to the figures. FIG. 1 is a flow diagram illustrating the sequence of steps in the inventive process for producing synthetic quartz glass.

The first step, as illustrated in FIG. 1(a), is to determine the annealing rate v (step a). In this step, an annealing rate v (the units for v are ° C./h) is determined from the S/V value (surface area S [mm$^2$] divided by volume V [mm$^3$]; units mm$^2$/mm$^3$) of the synthetic quartz glass used as parent material, which is the substance to be annealed, and the target birefringence Re [nm/cm] of the synthetic quartz glass after annealing. Hereafter, the synthetic quartz glass used as parent material, which is the substance to be annealed, is referred to simply as "parent material" or "parent material synthetic quartz glass".

In step a, more specifically, the annealing rate v [° C./h] can be determined from the S/V value [mm$^2$/mm$^3$] and the target birefringence Re [nm/cm] such that expression (1) below $$v \leq (Re + 390 \times S/V)/1.0 \quad (1)$$

is satisfied.

The derivation of expression (1) is described later.

Determining the annealing rate v such that expression (1) is satisfied allows the annealing to be performed at a more appropriate annealing rate. Specifically, it is possible to determine the annealing rate necessary to achieve the target birefringence, and so failure to achieve the target birefringence due to too fast an annealing rate and insufficient annealing time can be prevented. This also obviates the need to select a long annealing time and slow the annealing rate more than necessary. It should be noted that the annealing rate should be determined before the annealing rate is performed.

Also, it is preferable in one embodiment to determine the annealing rate v [° C./h] in a range such that expression (1), and expression (2) below $$v \geq 0.8 \times (Re + 390 \times S/V)/1.0 \quad (2)$$

are both satisfied.

Determining the annealing rate v in a range such that both expression (2) and abovementioned expression (1) are satisfied allows the annealing to be performed at an even more appropriate annealing rate. Slow annealing times are better for obtaining synthetic quartz glass which, after annealing, has low birefringence, and if annealing is to be performed for just long enough to achieve the target birefringence, it is preferable in one embodiment to set the lower limit of the annealing rate using expression (2).

In abovementioned expression (2), v≥0.8×(Re+390×S/V)/1.0, the coefficient "0.8" is preferably in one embodiment ≥0.85, and preferably in one embodiment ≥0.9. By increasing the annealing rate v in the range in which expression (1) is satisfied (that is, expression (2) and expression (1) are both satisfied), the annealing can be performed at a rate sufficient to achieve the target birefringence, and is not performed for longer than necessary. This can decrease the amount of energy required for the annealing treatment, and thereby lower the production costs associated with achieving the target birefringence. It can also allow the annealing time to be shortened, thereby improving productivity.

In the inventive process, the synthetic quartz glass used as the parent material can be cylindrical or disk-shaped. Here, the synthetic quartz glass after annealing is also cylindrical or disk-shaped. One embodiment is suitable when the parent material synthetic quartz glass and the synthetic quartz glass after annealing are cylindrical or disk-shaped. It should be noted that the shapes "cylindrical" and "disc-shaped" denote essentially the same three-dimensional shape in that the upper surface and base surface are circular, but "disc-shaped" refers to shapes that are thinner than their upper surface and lower surface. For convenience, three-dimensional shapes that are thinner than the diameter of their upper surface and lower surface are referred to as "disc-shaped", and three-dimensional shapes having a thickness that is the same as or greater than the diameter of their upper surface and lower surface are referred to as "cylindrical", although the inventive process is not limited to this.

As illustrated in FIG. 1(b), after the annealing rate has been determined in step a, the parent material synthetic quartz glass is inserted (carried) into the heat treatment furnace (step b, insertion step). The inside of the heat treatment furnace during the insertion step may be at room temperature, or may be at a temperature other than room temperature; for example, it may be slightly warmed beforehand.

As illustrated in FIG. 1(c), after the insertion step that is step b, the temperature inside the heat treatment furnace is elevated to a prescribed keeping temperature ($t_1$ [*C]) that is equal to or higher than the annealing point of the synthetic quartz glass (step c, temperature elevation step). In this step c, the temperature of the synthetic quartz glass also rises.

Next, as illustrated in FIG. 1(d), the temperature inside the heat treatment furnace is kept at a prescribed keeping temperature (step d, first keeping step). It should be noted that at this time, keeping temperature $t_1$ need not be completely constant, and may vary within the normal range for performing heat treatment to remove distortion in synthetic quartz glass. In step d, the temperature of the synthetic quartz glass rises to keeping temperature $t_1$, and is kept at keeping temperature $t_1$ thereafter.

Next, as illustrated in FIG. 1(e), after the first keeping step (step d), the temperature inside the heat treatment furnace is gradually decreased, while still heating inside the heat treatment furnace, to cool the inside of the heat treatment furnace to a prescribed temperature ($t_2$ [*C]) in order to anneal the synthetic quartz glass (step e, annealing step). In one embodiment, in this step e, annealing is performed at the annealing rate v that was determined in step a. The keeping temperature $t_1$ in the first keeping step (step d) is also the temperature at which the annealing starts, and in the annealing step, annealing is performed at from temperature $t_1$ to temperature $t_2$. Temperatures $t_1$ and $t_2$ can be selected in accordance with the annealing point and strain point of the parent material synthetic quartz glass.

In step e, the temperature inside the heat treatment furnace is gradually decreased, for example by decreasing the heater power. In the annealing step, the temperature is usually decreased at a constant gradient. However, it is not limited to this; in the annealing step, the temperature inside the heat treatment furnace should be gradually decreased while heating the inside of the heat treatment furnace, that is, while providing heat energy from the heat treatment furnace heater. Here, the temperature of the synthetic quartz glass decreases gradually with the temperature inside the heat treatment furnace. The temperature at which annealing is completed may be the same as or lower than the strain point, or may be higher than the strain point.

After the annealing step (step e), natural cooling is allowed to proceed (step g) and then the annealed synthetic quartz glass is taken out of the heat treatment furnace (step h, removal step), as illustrated in FIG. 1(h). After the annealing step but before the removal step there is an optional step, as illustrated in FIG. 1(f), where a second keeping step (step f) can be performed, and there can also be a natural cooling step (step g), as illustrated in FIG. 1(g). In the natural cooling step (step g), the heating of the inside of the heat treatment furnace is stopped and the temperature inside the heat treatment furnace is allowed to drop. More specifically, the provision of heat energy from the heater to inside the heat treatment furnace is stopped. Natural cooling is allowed to proceed, and after the annealed synthetic quartz glass has become cool enough to be taken out, it can be taken out of the heat treatment furnace.

Figure 3:
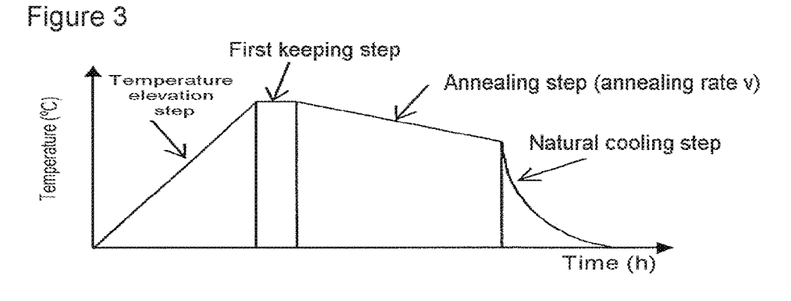
FIG. 3 is a graph illustrating an example of an annealing program for the annealing treatment in the method for producing synthetic quartz glass in accordance with one embodiment.

A specific example of an annealing program for the annealing treatment in the inventive process for producing synthetic quartz glass is illustrated in FIG. 3. This annealing program does not include an abovementioned second keeping step, and so after the annealing step (step e), natural cooling step g is performed and then the annealed synthetic quartz glass is taken out of the heat treatment furnace. This annealing program includes a temperature elevation step, a first keeping step, an annealing step, and a natural cooling step. The annealing rate v is also illustrated in FIG. 3. The annealing rate v, which is determined in advance in one embodiment, is the temperature gradient of the annealing step.

Figure 4:
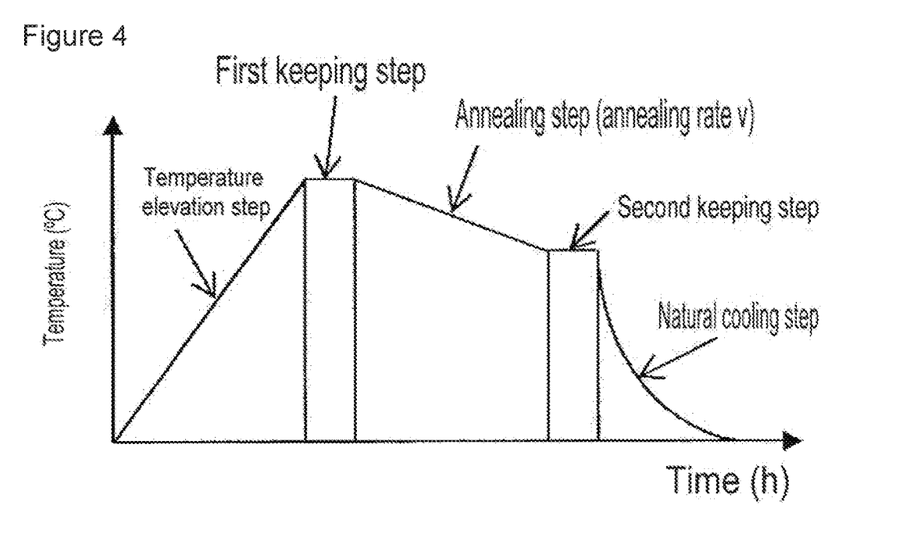
FIG. 4 is a graph illustrating another example of an annealing program for the annealing treatment in the method for producing synthetic quartz glass according to one embodiment.

Another specific example of an annealing program for the annealing treatment in the inventive process for producing synthetic quartz glass is illustrated in FIG. 4. In FIG. 4, after the annealing step (step e) there is a second keeping step (step f) whereby the temperature is kept at temperature ($t_2$), which is the temperature on completion of the annealing step (step e); after the second keeping step there is a natural cooling step (step g), and after the natural cooling step, the annealed synthetic quartz glass is taken out of the heat treatment furnace (step h). Here also, the annealing rate v is the temperature gradient of the annealing step, as illustrated in FIG. 4. It should be noted that, as with the keeping temperature $t_1$ in the first keeping step, the temperature in the second keeping step ($t_2$) need not be completely constant, and may vary within the normal range. Here, after the temperature of the synthetic quartz glass has fallen to keeping temperature $t_2$, it is kept at temperature $t_2$.

The annealing program illustrated in FIG. 3 allows relatively small glass to be treated for a short time; the annealing program illustrated in FIG. 4 evenly heats relatively large glass more efficiently, thereby making it easier to control the birefringence.

In this annealing treatment series (step b to step h), it is preferable in one embodiment not to use heat-insulating material around the synthetic quartz glass. This is because not using heat-insulating material can shorten the heating time and the annealing time. Nevertheless, heat-insulating material can be used if necessary.

In one embodiment, the parent material synthetic quartz glass that is to undergo the annealing treatment preferably in one embodiment has an S/V value of $\geq 0.012$ mm$^2$/mm$^3$ but $\leq 0.4$ mm$^2$/mm$^3$. When synthetic quartz glass having such an S/V value is used as the parent material, one embodiment can be employed appropriately. The lower limit of the parent material quartz glass S/V value range in which in one embodiment can be employed appropriately is more preferably in one embodiment $\geq 0.018$ mm$^2$/mm$^3$, and preferably in one embodiment $\geq 0.025$ mm$^2$/mm$^3$. The higher the upper limit of the S/V value the better in one embodiment.

In one embodiment, the parent material synthetic quartz glass can be synthetic quartz glass produced by various methods. For example, one embodiment can be employed when annealing synthetic quartz glass produced by the direct method or synthetic quartz glass produced by the VAD method.

The target birefringence Re [nm/cm] of the synthetic quartz glass after annealing is preferably in one embodiment $\geq 1.0$ nm/cm but $\leq 10.0$ nm/cm.

When the target birefringence is in this range, one embodiment can be employed appropriately.

In the inventive process for producing synthetic quartz glass, the keeping temperature in the first keeping step (step d) is preferably in one embodiment $\geq 1040°$ C. but $\leq 1300°$ C., and in the annealing step (step e), the annealing is preferably in one embodiment performed at a temperature between the keeping temperature in the first keeping step and a temperature lower than the keeping temperature in the first keeping step and ≥950° C. but ≤1160° C. Performing the first keeping step and the annealing step at such a temperature allows the annealing to be performed under appropriate conditions.

The derivation of abovementioned expression (1) is described below. The size and the post-annealing treatment birefringence were measured for several pieces of parent material synthetic quartz glass, and the measurements were plotted on a graph. Specifically, this was performed as follows.

First, cylindrical or disk-shaped parent material synthetic quartz glass was prepared. Here, the parent material synthetic quartz glass was prepared to various diameters and thicknesses, as illustrated in Table 1. The surface area and volume can be calculated from the diameter and thickness, and so the S/V value can also be calculated. The S/V values are also illustrated in Table 1.

Figure 2:
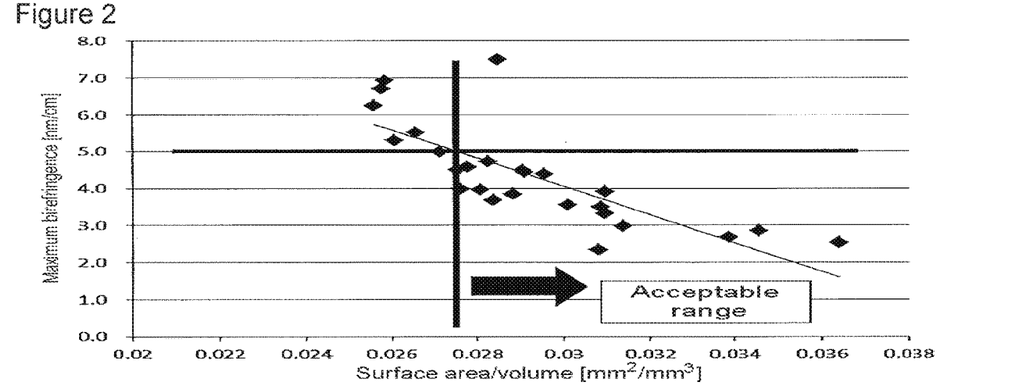
FIG. 2 is a graph illustrating experimental results used to obtain expression (1).

Next, the parent material synthetic quartz glass was subjected to annealing treatment to obtain annealed synthetic quartz glass. All were treated using the same annealing program, and then the birefringence was measured. Specifically, the following steps were performed. First, parent material synthetic quartz glass was introduced into an electric furnace at room temperature, heated to the first keeping temperature, 1200° C., and kept at that temperature for 1 hour. Next, it was annealed, over a period of 11 hours, to the second keeping temperature, 1030° C., and then kept at the second keeping temperature for 2 hours. The heater was then switched off and spontaneous natural cooling to room temperature was allowed to proceed, and the synthetic quartz glass was taken out of the heat treatment furnace. The maximum birefringence values of the resulting synthetic quartz glass are illustrated in Table 1. The maximum birefringence of the resulting synthetic quartz glass was plotted on the vertical axis, and the S/V value of the parent material synthetic quartz glass was plotted on the horizontal axis, as illustrated in FIG. 2. The diagonal line in FIG. 2 is a regression line of the plotted data, and the slope is approximately −390. A birefringence of ≤5.0 nm/cm was deemed acceptable.

TABLE 1

Dimensions of parent material

| Diameter [mm] | Thickness [mm] | S/V [mm²/mm³] | Birefringence [nm/cm] |
|---|---|---|---|
| 180 | 320 | 0.028 | 7.5 |
| 280 | 173 | 0.026 | 6.9 |
| 210 | 298 | 0.026 | 6.7 |
| 240 | 224 | 0.026 | 6.3 |
| 280 | 163 | 0.027 | 5.5 |
| 280 | 170 | 0.026 | 5.3 |
| 250 | 180 | 0.027 | 5.0 |
| 320 | 127 | 0.028 | 4.7 |
| 320 | 131 | 0.028 | 4.6 |
| 320 | 133 | 0.028 | 4.5 |
| 210 | 200 | 0.029 | 4.5 |
| 180 | 273 | 0.030 | 4.4 |
| 280 | 135 | 0.029 | 4.4 |
| 280 | 150 | 0.028 | 4.0 |
| 270 | 151 | 0.028 | 4.0 |
| 180 | 229 | 0.031 | 3.9 |
| 250 | 156 | 0.029 | 3.8 |
| 180 | 325 | 0.028 | 3.7 |
| 160 | 392 | 0.030 | 3.6 |
| 160 | 342 | 0.031 | 3.5 |

TABLE 1-continued

Dimensions of parent material

| Diameter [mm] | Thickness [mm] | S/V [mm²/mm³] | Birefringence [nm/cm] |
|---|---|---|---|
| 280 | 120 | 0.031 | 3.3 |
| 280 | 117 | 0.031 | 3.0 |
| 160 | 209 | 0.035 | 2.9 |
| 250 | 112 | 0.034 | 2.7 |
| 250 | 98 | 0.036 | 2.6 |
| 210 | 170 | 0.031 | 2.4 |

The resulting birefringence Re and parent material S/V values were proportional, as illustrated in FIG. 2, and the intercept of the graph was inversely proportional to the annealing rate in the annealing program (15.5° C./h); an expression relating Re, S/V, and v was found. Thus expression (1) was obtained.

$$v \leq (Re + 390 \times S/V)/1.0 \quad (1)$$

The same results were obtained when the program was performed at a different temperature.

EXAMPLES

Embodiments are described in more detail below with reference to examples and comparative examples, but the present invention is not limited to these examples.

Example 1

Cylindrical (disk-shaped) synthetic quartz glass (synthetic quartz glass for use as parent material) of diameter 320 mm and thickness 130 mm was prepared. The S/V value of this parent material synthetic quartz glass was 0.028 mm²/mm³. This parent material synthetic quartz glass was subjected to an annealing treatment as illustrated in FIG. 1 and FIG. 4, to obtain annealed synthetic quartz glass. The target birefringence Re of the synthetic quartz glass after annealing was ≤5.0 nm/cm. When the annealing rate v was calculated from the abovementioned S/V value and birefringence using expression (1), v was found to be ≤15.9 [° C./h] (step a). Therefore, the actual annealing rate was set at 15.5° C./h. This also satisfied expression (2). This synthetic quartz glass was introduced into a room temperature electric furnace (step b). Next, it was heated to 1200° C., which was the first keeping temperature (keeping temperature $t_1$ in the first keeping step) (step c), and then kept at that temperature for 1 hour (step d). Next, it was annealed, over a period of 11 hours, to 1030° C., the second keeping temperature (keeping temperature $t_2$ in the second keeping step) (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 2

Cylindrical (disk-shaped) synthetic quartz glass (synthetic quartz glass for use as parent material) of diameter 210 mm and thickness 200 mm was prepared. The S/V value of this parent material synthetic quartz glass was 0.029 mm²/mm³.

This parent material synthetic quartz glass was subjected to annealing treatment as illustrated in FIG. 1 and FIG. 4, to obtain annealed synthetic quartz glass. The target birefringence Re of the synthetic quartz glass after annealing was ≤5.0 nm/cm. When the annealing rate v was calculated from the abovementioned S/V value and birefringence using expression (1), v was found to be ≤16.3 [° C./h] (step a). Therefore, the actual annealing rate was set at 15.5° C./h. This also satisfied expression (2). This synthetic quartz glass was introduced into a room temperature electric furnace (step b). Next, it was heated to 1200° C. which was the first keeping temperature (step c), and then kept at that temperature for 1 hour (step d). Next, it was annealed, over a period of 11 hours, to 1030° C., the second keeping temperature (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 3

Cylindrical synthetic quartz glass (synthetic quartz glass for use as parent material) of diameter 180 mm, thickness 270 mm was prepared. The S/V value of this parent material synthetic quartz glass was 0.030 mm$^2$/mm$^3$. This parent material synthetic quartz glass was subjected to annealing treatment as illustrated in FIG. 1 and FIG. 4, to obtain annealed synthetic quartz glass. The target birefringence Re of the synthetic quartz glass after annealing was ≤5.0 nm/cm. When the annealing rate v was calculated from the abovementioned S/V value and birefringence using expression (1), v was found to be ≤16.6 [° C./h] (step a). Therefore, the actual annealing rate was set at 15.5° C./h. This also satisfied expression (2). This synthetic quartz glass was introduced into a room temperature electric furnace (step b). Next, it was heated to 1200° C., the first keeping temperature (step c), and then kept at that temperature for 1 hour (step d). Next, it was annealed, over a period of 11 hours, to 1030° C., the second keeping temperature (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 4

Cylindrical (disc-shaped) synthetic quartz glass (synthetic quartz glass for use as parent material) of diameter 240 mm, thickness 225 mm was prepared. The S/V value of this parent material synthetic quartz glass was 0.026 mm$^2$/mm$^3$. This parent material synthetic quartz glass was subjected to annealing treatment as illustrated in FIG. 1 and FIG. 4, to obtain annealed synthetic quartz glass. The target birefringence Re of the synthetic quartz glass after annealing was ≤5.0 nm/cm. When the annealing rate v was calculated from the abovementioned S/V value and birefringence using expression (1), v was found to be ≤15.0 [° C./h] (step a). Therefore, the actual annealing rate was set at 14.2° C./h. This also satisfied expression (2). This synthetic quartz glass was introduced into a room temperature electric furnace (step b). Next, it was heated to 1200° C., the first keeping temperature (step c), and then kept at that temperature for 1 hour (step d). Next, it was annealed, over a period of 12 hours, to 1030° C., the second keeping temperature (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 5

Cylindrical (disc-shaped) synthetic quartz glass (synthetic quartz glass for use as parent material) of diameter 240 mm, thickness 225 mm was prepared. The S/V value of this parent material synthetic quartz glass was 0.026 mm$^2$/mm$^3$. This parent material synthetic quartz glass was subjected to annealing treatment as illustrated in FIG. 1 and FIG. 4, to obtain annealed synthetic quartz glass. The target birefringence Re of the synthetic quartz glass after annealing was ≤2.0 nm/cm. When the annealing rate v was calculated from the abovementioned S/V value and birefringence using expression (1), v was found to be ≤12.0 [° C./h] (step a). Therefore, the actual annealing rate was set at 12.0° C./h. This also satisfied expression (2). This synthetic quartz glass was introduced into a room temperature electric furnace (step b). Next, it was heated to 1250° C., the first keeping temperature (step c), and then kept at that temperature for 1 hour (step d). Next, it was annealed, over a period of 15 hours, to 1070° C., the second keeping temperature (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 6

Cylindrical (disc-shaped) synthetic quartz glass (synthetic quartz glass for use as parent material) of diameter 240 mm, thickness 225 mm was prepared. The S/V value of this parent material synthetic quartz glass was 0.026 mm$^2$/mm$^3$. This parent material synthetic quartz glass was subjected to annealing treatment as illustrated in FIG. 1 and FIG. 4, to obtain annealed synthetic quartz glass. The target birefringence Re of the synthetic quartz glass after annealing was ≤10.0 nm/cm. When the annealing rate v was calculated from the abovementioned S/V value and birefringence using expression (1), v was found to be ≤20.0 [° C./h] (step a). Therefore, the actual annealing rate was set at 18.9° C./h. This also satisfied expression (2). This synthetic quartz glass was introduced into a room temperature electric furnace (step b). Next, it was heated to 1150° C., the first keeping temperature (step c), and then kept at that temperature for 1 hour (step d). Next, it was annealed, over a period of 9 hours, to 980° C., the second keeping temperature (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 7

Cylindrical (disc-shaped) synthetic quartz glass (synthetic quartz glass for use as parent material) of diameter 300 mm, thickness 150 mm was prepared. The S/V value of this parent material synthetic quartz glass was 0.027 mm$^2$/mm$^3$. This parent material synthetic quartz glass was subjected to annealing treatment as illustrated in FIG. 1 and FIG. 4, to obtain annealed synthetic quartz glass. The target birefringence Re of the synthetic quartz glass after annealing was ≤10.0 nm/cm. When the annealing rate v was calculated from the abovementioned S/V value and birefringence using expression (1), v was found to be ≤20.4 [° C./h] (step a). Therefore, the actual annealing rate was set at 19.2° C./h. This also satisfied expression (2). This synthetic quartz glass was introduced into a room temperature electric furnace (step b). Next, it was heated to 1250° C., the first keeping temperature (step c), and then kept at that temperature for 1 hour (step d). Next, it was annealed, over a period of 12 hours, to 1020° C., the second keeping temperature (step e), and then kept at the second keeping temperature for 2 hours (step f). The heater was then switched OFF and spontaneous natural cooling to room temperature was allowed to proceed (step g), and then the synthetic quartz glass was taken out of the heat treatment furnace (step h). The birefringence of the glass obtained was measured using a birefringence meter. The results are illustrated in Table 2. The birefringence of the annealed synthetic quartz glass satisfied the target birefringence.

Example 8

Cylindrical (disc-shaped) synthetic quartz glass (synthetic quartz glass for use as parent material) of diameter 150 mm, thickness 250 mm was prepared. The S/V value of this parent material synthetic quartz glass was 0.035 mm$^2$/mm$^3$. This parent material synthetic quartz glass was subjected to annealing treatment as illustrated in FIG. 1 and FIG. 3, to obtain annealed synthetic quartz glass. The target birefringence Re of the synthetic quartz glass after annealing was ≤2.0 nm/cm. When the annealing rate v was calculated from the abovementioned S/V value and birefringence using expression (1), v was found to be ≤15.5 [° C./h] (step a). Therefore, the actual annealing rate was set at 14.2° C./h. This also satisfied expression (2). This synthetic quartz glass was introduced into a room temperature electric furnace (step b). Next, it was heated to 1200° C., the first keeping temperature (step c), and then kept at that temperature for 1 hour (step d). Next, it was annealed, over a period of 12 hours, to 1030° C., the second keeping temperature (step e). The heater was then switched OFF and spontaneous natural cooling to room temperature was allowed to proceed (step g), and then the synthetic quartz glass was taken out of the heat treatment furnace (step h). Specifically, the second keeping step (step f) was not performed in this Example 8. The birefringence of the glass obtained was measured using a birefringence meter. The results are illustrated in Table 2. The birefringence of the annealed synthetic quartz glass satisfied the target birefringence.

Comparative Example 1

Cylindrical (disc-shaped) synthetic quartz glass of diameter 240 mm, thickness 225 mm, was heated in a room temperature electric furnace to a first keeping temperature of 1200° C., kept at that temperature for 1 hour, and then annealed, over a period of 10 hours, to a second keeping temperature of 1030° C., and then kept at the second keeping temperature for 2 hours; the heater was then switched OFF and spontaneous natural cooling to room temperature was allowed to proceed. Specifically, here, the annealing rate was 17.0 [° C./h]. The birefringence of the glass obtained was measured using a birefringence meter. The results are illustrated in Table 2. The target birefringence for this annealing process was ≤5.0 nm/cm, but the birefringence of the quartz glass after annealing did not satisfy the target birefringence. Calculation using expression (1) revealed that the necessary annealing rate v for cylindrical (disc-shaped) synthetic quartz glass of diameter 240 mm, thickness 225 mm is v≤15.0 [° C./h]. The annealing rate used was not in this range.

Comparative Example 2

Cylindrical (disc-shaped) synthetic quartz glass of diameter 320 mm, thickness 220 mm, was heated in a room temperature electric furnace to a first keeping temperature of 1200° C., kept at that temperature for 1 hour, and then annealed, over a period of 12 hours, to a second keeping temperature of 1030° C., and then kept at the second keeping temperature for 2 hours; the heater was then switched OFF and spontaneous natural cooling to room temperature was allowed to proceed. Specifically, here, the annealing rate was 14.2 [° C./h]. The birefringence of the glass obtained was measured using a birefringence meter. The results are illustrated in Table 2. The target birefringence for this annealing process was ≤5.0 nm/cm, but the birefringence of the quartz glass after annealing did not satisfy the target birefringence. Calculation using expression (1) revealed that the necessary annealing rate v for cylindrical (disc-shaped) synthetic quartz glass of diameter 320 mm, thickness 220 mm is v≤13.4 [° C./h]. The annealing rate used was not in this range.

TABLE 2

| | Dimensions of parent material | | S/V [mm²/mm³] | Birefrin- gence [nm/cm] | Upper limit of v based on expression (1) [° C./h] | Lower limit of v based on expression (2) [° C./h] | First keeping temperature [° C.] | Second keeping temperature [° C.] | Annealing time [h] | Actual annealing rate [° C./h] | Birefrin- gence after heat treatment [nm/cm] |
|---|---|---|---|---|---|---|---|---|---|---|---|
| | Diameter [mm] | Thickness [mm] | | | | | | | | | |
| Example 1 | 320 | 130 | 0.028 | 5.0 | 15.9 | 12.7 | 1200 | 1030 | 11 | 15.5 | 4.7 |
| Example 2 | 210 | 200 | 0.029 | 5.0 | 16.3 | 13.1 | 1200 | 1030 | 11 | 15.5 | 4.5 |
| Example 3 | 180 | 270 | 0.030 | 5.0 | 16.6 | 13.2 | 1200 | 1030 | 11 | 15.5 | 4.4 |
| Example 4 | 240 | 225 | 0.026 | 5.0 | 15.0 | 12.0 | 1200 | 1030 | 12 | 14.2 | 4.7 |
| Example 5 | 240 | 225 | 0.026 | 2.0 | 12.0 | 9.6 | 1250 | 1070 | 15 | 12.0 | 1.9 |
| Example 6 | 240 | 225 | 0.026 | 10.0 | 20.0 | 16.0 | 1150 | 980 | 9 | 18.9 | 8.8 |
| Example 7 | 300 | 150 | 0.027 | 10.0 | 20.4 | 16.3 | 1250 | 1020 | 12 | 19.2 | 8.5 |
| Example 8 | 150 | 250 | 0.035 | 2.0 | 15.5 | 12.4 | 1200 | 1030 (no keeping) | 12 | 14.2 | 1.8 |
| Comparative Ex. 1 | 240 | 225 | 0.026 | 5.0 | 15.0 | 12.0 | 1200 | 1030 | 10 | 17.0 | 6.3 |
| Comparative Ex. 2 | 320 | 220 | 0.022 | 5.0 | 13.4 | 10.7 | 1200 | 1000 | 12 | 16.7 | 7.5 |

As illustrated in Table 2, the synthetic quartz glass satisfied the target birefringence at the minimum necessary annealing time in examples 1-8, but in comparative examples 1 and 2 the annealing time was insufficient and it was not possible to obtain a synthetic quartz glass that satisfied the target birefringence.

It should be noted that the present invention is not limited to the mode described above. The mode described above is merely an example; anything having essentially the same construction as the technical concept described in the scope of the patent claims of the invention is within the technical scope of the invention.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

What is claimed is:

1. A method for producing a synthetic quartz glass including an annealing treatment of a synthetic quartz glass, the annealing treatment comprising:
a step for putting a synthetic quartz glass as a parent material into a heat treatment furnace;
a temperature elevation step for elevating a temperature to a prescribed keeping temperature that is equal to or higher than the annealing point of the synthetic quartz glass;
a first keeping step for keeping the temperature in the heat treatment furnace at the keeping temperature;
an annealing step, after the first keeping step, for annealing the synthetic quartz glass by gradually lowering the temperature in the heat treatment furnace to a prescribed temperature while heating the inside of the heat treatment furnace; and
a step for taking the synthetic quartz glass after annealing out of the heat treatment furnace,
wherein the method for producing the synthetic quartz glass also comprises a step for determining an annealing rate v [° C./h], which is a rate for annealing the synthetic quartz glass in the annealing step, based on a value of S/V [mm²/mm³] wherein S [mm²] is the surface area of the synthetic quartz glass as a parent material and V [mm³] is the volume thereof, and a target birefringence Re [nm/cm] for the synthetic quartz glass after annealing, and the annealing step is performed at the determined annealing rate v;
wherein the size of the parent material is fixed; and
wherein, in the step for determining the annealing rate v [° C./h], the annealing rate v is determined so as to satisfy an expression (1):

$$v \leq (Re + 390 \times S/V)/1.0$$

based on the value of S/V [mm²/mm³] and the target birefringence Re [nm/cm].

2. The method for producing a synthetic quartz glass according to claim 1, wherein the annealing rate v is determined in the range that satisfies both of the expression (1) and an expression (2):

$$v \geq 0.8 \times (Re + 390 \times S/V)/1.0.$$

3. The method for producing a synthetic quartz glass according to claim 1, wherein no heat insulating material is used around the synthetic quartz glass in the annealing treatment.

4. The method for producing a synthetic quartz glass according to claim 1, wherein the shape of the synthetic quartz glass as a parent material is a cylindrical shape or a disc shape.

5. The method for producing a synthetic quartz glass according to claim 1, wherein the synthetic quartz glass as a parent material is a synthetic quartz glass having the value of S/V of 0.012 mm²/mm³ to 0.4 mm²/mm³.

6. The method for producing a synthetic quartz glass according to claim 1, wherein the target birefringence Re [nm/cm] of the synthetic quartz glass after annealing is 1.0 nm/cm to 10.0 nm/cm.

7. The method for producing a synthetic quartz glass according to claim 1, wherein the keeping temperature in the first keeping step is in the range of from 1040° C. to 1300° C.; and
in the annealing step, the annealing is performed from the keeping temperature in the first keeping step to a temperature that is lower than the keeping temperature in the first keeping step and in the range of from 950° C. to 1160° C.

8. The method for producing a synthetic quartz glass according to claim 1, the method comprising a natural cooling step, after the annealing step, for stopping the heating of the heat treatment furnace to lower the temperature in the heat treatment furnace; and after the natural cooling step, the synthetic quartz glass after annealing is taken out of the heat treatment furnace.

9. The method for producing a synthetic quartz glass according to claim 1, the method comprising:

a second keeping step, after the annealing step, for keeping the temperature at the end of the annealing step; and a natural cooling step, after the second keeping step, for stopping the heating in the heat treatment furnace to lower the temperature in the heat treatment furnace, and after the natural cooling step, the synthetic quartz glass after annealing is taken out of the heat treatment furnace.

10. A method for producing a synthetic quartz glass including an annealing treatment of a synthetic quartz glass, the annealing treatment comprising:

putting a synthetic quartz glass as a parent material into a heat treatment furnace;

elevating a temperature to a prescribed keeping temperature that is equal to or higher than the annealing point of the synthetic quartz glass;

keeping the temperature in the heat treatment furnace at the keeping temperature;

after keeping at the keeping temperature, annealing the synthetic quartz glass by gradually lowering the temperature in the heat treatment furnace to a prescribed temperature while heating the inside of the heat treatment furnace; and taking the synthetic quartz glass, after annealing, out of the heat treatment furnace, wherein the method for producing the synthetic quartz glass also comprises determining an annealing rate v [° C./h], which is a rate for annealing the synthetic quartz glass, based on a value of S/V [$mm^2/mm^3$] wherein S [$mm^2$] is the surface area of the synthetic quartz glass as a parent material and V [$mm^3$] is the volume thereof, and a target birefringence Re [nm/cm] for the synthetic quartz glass after annealing, and the annealing is performed at the determined annealing rate v;

wherein the size of the parent material is fixed and is a cylindrical shape or a disc shape; and wherein, in the step for determining the annealing rate v [° C./h], the annealing rate v is determined so as to satisfy an expression (1):

$$v \leq (Re + 390 \times S/V)/1.0$$

based on the value of S/V [$mm^2/mm^3$] and the target birefringence Re [nm/cm].

11. The method for producing a synthetic quartz glass according to claim 10, wherein the synthetic quartz glass as a parent material is a synthetic quartz glass having the value of S/V of 0.012 $mm^2/mm^3$ to 0.4 $mm^2/mm^3$.

* * * * *